(No Model.) 6 Sheets—Sheet 1.

D. L. GOFF.
MECHANISM FOR DELIVERING AND CUTTING ROLL PAPER.

No. 478,231. Patented July 5, 1892.

(No Model.) 6 Sheets—Sheet 2.
D. L. GOFF.
MECHANISM FOR DELIVERING AND CUTTING ROLL PAPER.
No. 478,231. Patented July 5, 1892.

(No Model.) 6 Sheets—Sheet 3.
D. L. GOFF.
MECHANISM FOR DELIVERING AND CUTTING ROLL PAPER.
No. 478,231. Patented July 5, 1892.

(No Model.) 6 Sheets—Sheet 5.

D. L. GOFF.
MECHANISM FOR DELIVERING AND CUTTING ROLL PAPER.

No. 478,231. Patented July 5, 1892.

Attest:
Philip F. Larner
Howell Bertle

Inventor:
Darius L. Goff
By  Attorney

(No Model.)  6 Sheets—Sheet 6.

D. L. GOFF.

MECHANISM FOR DELIVERING AND CUTTING ROLL PAPER.

No. 478,231.  Patented July 5, 1892.

Attest:
Philip F. Larner
Lowell Bentle

Inventor:
Darius L. Goff
By McMoss
Attorney

UNITED STATES PATENT OFFICE.

DARIUS L. GOFF, OF PAWTUCKET, RHODE ISLAND.

MECHANISM FOR DELIVERING AND CUTTING ROLL-PAPER.

SPECIFICATION forming part of Letters Patent No. 478,231, dated July 5, 1892.

Application filed September 25, 1890. Serial No. 366,075. (No model.)

*To all whom it may concern:*

Be it known that I, DARIUS L. GOFF, of Pawtucket, in the county of Providence and State of Rhode Island, have invented certain new and useful Improvements in Mechanism for Delivering and Cutting Paper from Roll-Packages in Predetermined Lengths, both Uniform and Varied; and I do hereby declare that the following specification, taken in connection with the drawings furnished and forming a part thereof, is a clear, true, and complete description of the several features of my invention.

Although machines embodying more or less of my said improvements are applicable to any service wherein it is or may be desirable to draw paper from a roll-package and readily detach the withdrawn portions, I have in the main devised them with reference to their use in connection with roll-packages or rolls of closet-paper. In this latter connection it has been found to involve economy in hotels, for instance, if paper be supplied to closets in roll-package form as distinguished from packages of cut sheets. Various organizations have been heretofore devised with a view to guarding against undue withdrawal of such paper from both sheets and rolls, and thereby more or less undue appropriation by guests, as well as a wasteful use, and these in part constitute the objects of my present invention.

A characteristic feature of machines embodying my said invention consists in the combination, with means by which a roll-package of paper may be rotatively mounted, of a measuring-roll which is rotative by its contact with the paper as it is drawn outwardly and stopping mechanism operated and controlled by said measuring-roll, which if not prevented from so doing will restrict the rotation of the roll to one revolution, and thereby gage or measure the length of paper drawn off, this being predetermined by the circumferential dimensions of said roll; or if the stop-motion be for a time rendered inoperative the length of paper will be proportioned to the permitted number of complete revolutions of said roll.

Another prominent feature of my invention consists in the combination, with a suitable rotatively-mounted blade or cutter, of a roll which determines the length of the paper to be detached by the cutter. In a preferred form of my machines there are four rolls for operation in connection with two roll-packages of paper. Although said machine has four rolls, they in substance constitute three co-operating pairs of rolls. Under one classification each pair includes one measuring-roll and a roll which carries the knife, and hence it will be termed a "cutter-roll," and in the other classification the two measuring-rolls constitute a third pair, in that each serves not only to release the other from its stopping mechanism, but also imparts a partial forward rotation to said other roll, and in each of the other pairs the two rolls co-operate, in that the measuring-roll imparts corresponding rotative movement to the cutter-roll and enables it to properly present its knife for service and to hold it firmly at the line at which the paper is to be cut by a torsional longitudinal pull upon the drawn-off length of paper, as is common in the use of ordinary straight-edged tin paper-cutters.

In a less-preferred but simpler form of my machines, adapted to deliver from two-roll packages of paper, one pair of rolls is employed, and these are both measuring-rolls, and they are, in combination with knives or cutters, for service as before described; but instead of the knife being carried by or upon separate rolls they are mounted upon the measuring-rolls, which are therefore, also, cutter-rolls. These two combined measuring and cutter rolls are in combination with stopping mechanism, and both rolls alternately operate for releasing each other from the intermitting custody of said stopping mechanism, and neither roll can make more than one complete revolution, and this only after it has been released by the other roll after each stop. In the use of all of my double machines (requiring two roll packages of paper) a length is first drawn off (and cut) from either one of the packages, and this operation near its close causes the other measuring-roll to so operate as to advance a short portion of paper from the other measuring-roll, and then by pulling upon this projected end that paper is drawn off until the roll is stopped, and meantime and in like manner a length of paper from the other roll will have been projected, and so on until a desired number of pieces have been procured.

In another form of my machine but one roll of paper can be used; but in these single machines the measuring-roll is also in combination with stopping mechanism and with a cutter. The stopping mechanism in the single machines operates automatically, as in the double machines, but, unlike them, the releasing is not automatic, but requires special manipulation, as distinguished from merely pulling on one or the other of the two lengths of paper, as in the double machines. In one form of my single machines the partial forward movement of the rolls is due to manipulation; but in another form said operation is automatic, immediately following the manipulated release. In the double and in the single machines there is the same step-by-step or intermitting and alternating delivery of the paper. An alternating system of delivery from lengths of paper in flatly-wound roll-packages has been heretofore provided for by means of machines embodying a knife or cutter; but the lengths of paper cut varied progressively, the pieces growing shorter as the flat packages were reduced in size, as distinguished from my system of delivery, which affords proper uniform lengths regardless of the gradually-reduced circumferential dimensions of the roll-packages. The alternating system of delivery is obviously conducive to the non-withdrawal of more paper than may at any time be needed, and also to at least a moderate misappropriation of paper carried from the closet, all with such resultant non-wasteful use as will involve substantial economy—in such large hotels, for instance, as expend each year many hundreds and even thousands of dollars for closet-paper.

After describing in detail several forms of my machines embodying all or valuable portions of my invention the features deemed novel will be duly specified in the several clauses of claim hereunto annexed.

Referring to the drawings.

Figure 4:
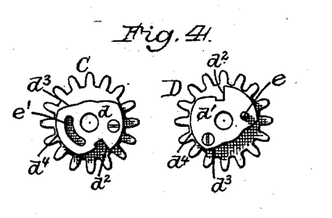
Fig. 4 illustrates the inner or coincident ends of the two upper or measuring rolls.
Figure 5:
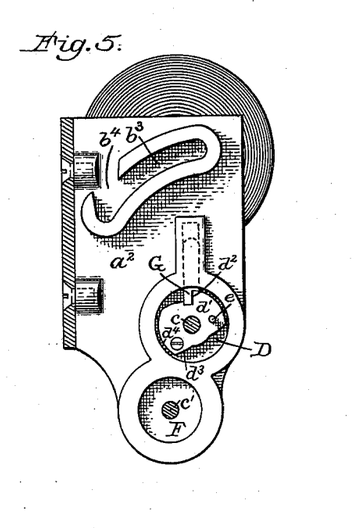
Fig. 5 is a central vertical sectional view of the machine on a line between a central hanger-plate and one pair of rolls.
Figure 6:
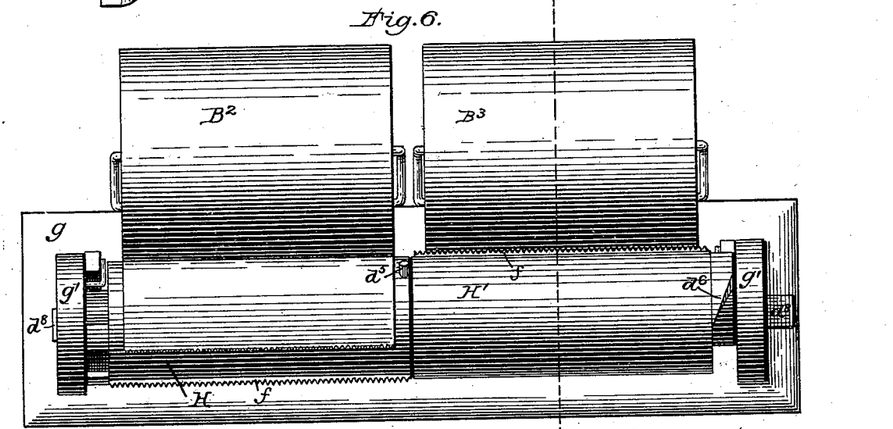
Figs. 6, 7, and 8 illustrate another form of double machine, respectively, in front view, end view, and vertical cross-section on line $x$, Fig. 6.
Figure 7:
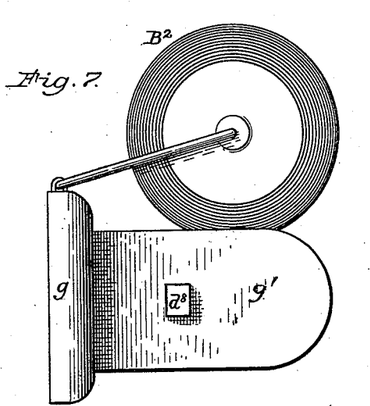
Figure 8:
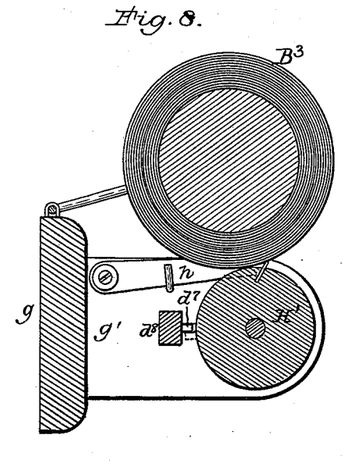
Figure 9:
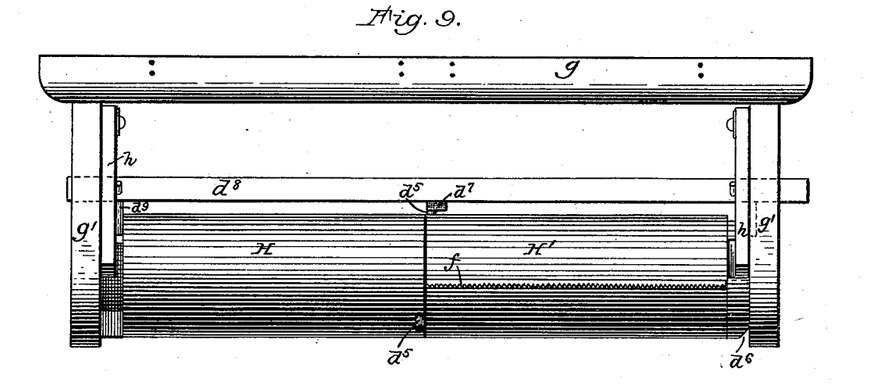
Fig. 9 is a plan view of the same with the roll-packages of paper removed.
Figure 10:
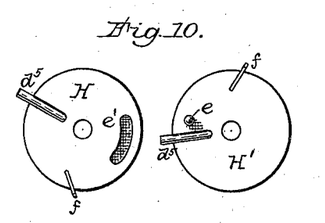
Fig. 10 illustrates the inner ends of the two working-rolls.

I will first describe the preferred form of double machine shown in Figs. 1 to 5, inclusive. This machine is provided with a suitable frame A, having a back plate $a$, provided with holes for screws to enable it to be securely mounted on a wall. Said frame has also two end plates $a'$ $a'$, which project for service as brackets or hangers, and between these there is a central hanger-plate $a^2$. It being not infrequent for closet-paper machines to be stolen or at least detached in order to steal the roll of paper, I have guarded against this, at least while the roll of paper is still of substantial dimensions, by locating screw-holes in the back plate at the rear of the rolls of paper, thus rendering the heads of mounting-screws inaccessible, and to the same end the screws by which the end plates are secured to the back plate may be entered from the rear of the back plate. The roll-packages of paper B and B' are coiled or wound upon axial cores $b$, which are each centrally bored for the loose reception of a rod $b'$, entered through a hole $b^2$ in the end plate. This rod in each instance affords journals for the roll-package, and it is a little shorter than the distance between one end plate and the coincident side of the central plate. The journal ends of the rod occupy two cam-shaped slots $b^3$ in raised bosses on the inner side of the end plate and also on a coincident side of the central plate, and at the inner and lower end of each slot there is on the upper side thereof an opening or gating $b^4$. As thus far described it will be seen when a roll-package of paper is placed with its axial hole opposite the hole $b^2$ in the end plate and the rod $b$ fully inserted that the latter cannot thereafter be removed until the paper has been all drawn off and the rod has passed downward to the gating $b^4$, at which time the empty core may be lifted out with the rod and a new roll-package inserted, as before. This construction and arrangement of the mountings for the roll-package involves novelty of practical value in that it guards against that misappropriation of full or even partially-depleted roll-packages which is now frequently practiced with corresponding loss to landlords. While a wooden core is desirable in all cases, the roll-packages may be wound upon a corrugated spindle, which when detached will leave an axial opening for the reception of the rod or shaft $b'$. In these hanger-plates four working rolls are mounted—two below and a little in front of each roll-package. Two long rods $c$ and $c'$, occupying holes $c^2$ in the two end plates, serve as supporting-shafts for each two rolls in the same horizontal plane, said rolls having axial holes, by which they are freely journaled on said rods. The two upper rolls C D are what I have called "measuring-rolls" and the two lower rolls E and F the "cutter-rolls." As thus far described it will be seen that if the free end of a roll of paper be passed between either vertical pair of rolls and then pulled outwardly that the upper or measuring roll will be rotated by the frictional contact of the paper therewith and that by restricting the rotation of said roll to one revolution the length of paper so drawn will be equal to the circumference of said roll, and in order that said measuring-rolls may be as small as possible and yet afford the required length of paper they are corrugated longitudinally, so that when employed with similarly-corrugated lower or cutter rolls a greater length of paper is afforded by each rotation than would be the case with plain-surfaced measuring-rolls of the same external diametrical dimensions. With a plain-surfaced measuring-roll gearing must be employed for coupling it to its bed-roll or cutter-roll, because both must be correspondingly rotated, and as the corrugations described serve also as gearing they constitute a valuable feature of novelty in machines of this class. Now for restricting each measuring-roll to one complete revolution, stopping mechanism is required, and this may be quite widely varied in its character without departure from the main features of my invention. In this machine the stopping mechanism is extremely simple and effective, and it consists of one pawl, which engages with stop-shoulders at the inner ends of the two measuring-rolls C and D. This pawl may be of the spring-actuated type or in the simpler form shown in Fig. 5, which is a gravity-pawl G, freely sliding vertically in a mortise formed in the central hanger-plate $a^2$. The head of the pawl is long enough to overhang portions of the coincident ends of the measuring-rolls C and D, and it alternately engages with stop-shoulders which may be formed directly on said rolls, but preferably, as shown, on cam-plates $d$ and $d'$, respectively applied to the ends of the two rolls, as shown in Fig. 4. These cam-plates have each a stop-shoulder $d^2$, which, as the roll revolves, abuts against one side of the pawl-head when in its lowest position, and stops that one of the two rolls which is in its turn to be thus stopped. Until this pawl is lifted no further rotation of the stopped roll can occur, and although this lifting may be performed by manipulation without departure from certain portions of my invention, it is in this machine automatically performed.

In this case each measuring-roll does releasing duty for the other. Each cam-plate is provided with a pawl-lifting face $d^3$ and a pawl-carrying face $d^4$, and when the two measuring-rolls are in proper position the stop-shoulders and said lifting and carrying faces on either cam-plate are offset in position from those on the other plate, and therefore the lifting and carrying faces on either plate can take control of the pawl and release it from the stop-shoulder of the other plate. This operation involves a necessity in both rolls of the required freedom of rotation independently of each other during the lifting of the pawl from a stop-shoulder. This independent capacity for partial independent rotation is afforded by means of a pin $e$ on one cam-plate, which projects into and freely occupies a curved slot $e'$ in the other plate, thus permitting either roll C or D to release the other from the pawl, and to then impart to the released roll a partial rotation corresponding to the length of the curved slot $e'$. This partial rotation of the released roll is important because thereby the last-cut end of paper is projected, so that it may be conveniently grasped for pulling. The lower or bed rolls may or may not perform service as cutter-rolls; but in this machine the rolls E and F are each provided with a knife or cutter $f$, preferably having a serrated edge in machines for this service. Said rotatively-mounted knife in each instance is located in one of the corrugations, and it is so adjusted with reference to the co-operating measuring-roll as to occupy the corrugation which is diametrically opposite the stop-shoulder $d^2$ in said measuring-roll, thus placing and holding the cutter in proper position for service when the stop-pawl operates.

Figure 1:
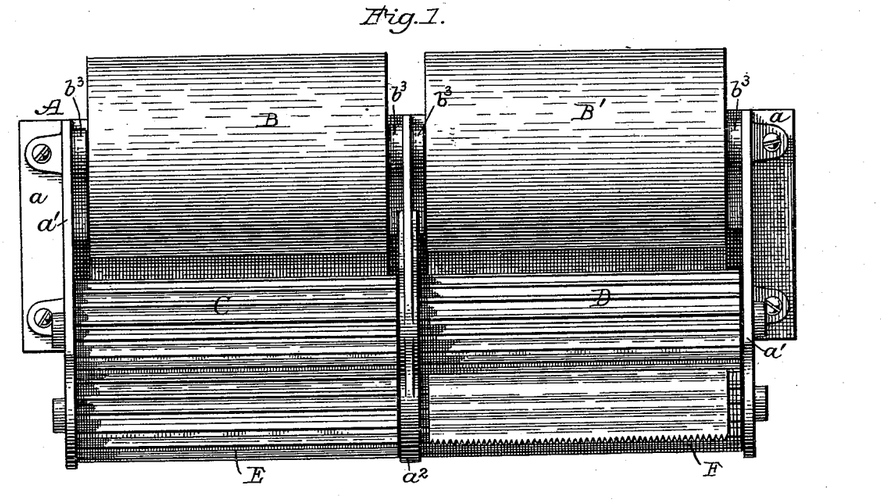
Figures 1, 2, and 3 illustrate a preferred form of my double machine, respectively, in front view, end view, and in section midway across one measuring-roll and the co-operating lower or cutter roll.
Figure 2:
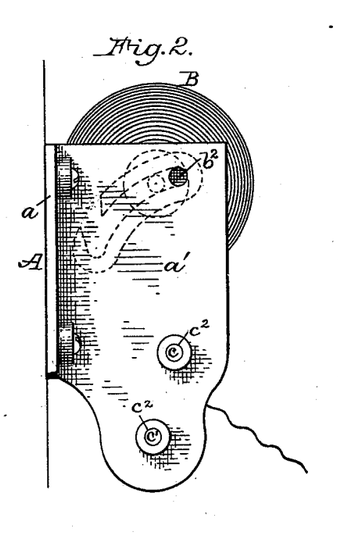
Figure 3:
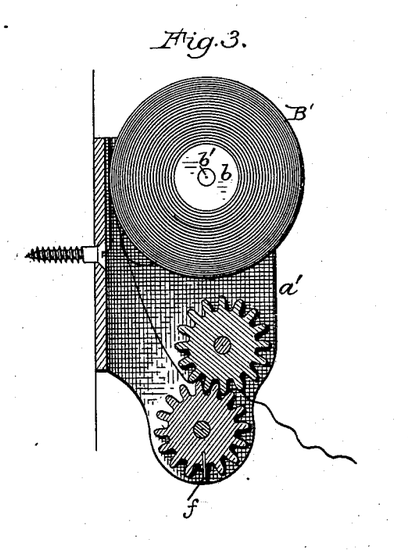

A machine thus constructed and organized is operated as follows: Referring to Fig. 1, it will be understood that a full length of paper has been drawn and cut from the left-hand roll-package B through its rolls C and E, and it will be seen that a short length from the right-hand roll-package is projected from its rolls D and F. The left-hand measuring-roll C is under the control of the stop-pawl, and is therefore immovable, as is true of its cutter-roll E, which has its knife located at its upper side, so that a torsional longitudinal pull on fully-extended paper will cause it to be cut off, leaving the end from which it was cut at the rear of the knife, but still well entered between the rolls. Then by next pulling the projected end from the right-hand roll-package B' its rolls D and F will be freely rotated to the extent of the length of the curved slot $e'$. This rotative movement first causes the lifting of the pawl from the stop-shoulder of the other measuring-roll C, supporting it meantime until the pin $e$ is abutted by the end of said curved slot, whereupon the said measuring-roll C and its cutter-roll E are rotated until a grasping length has been projected from the left-hand roll-package B, and meantime the delivery from the right-hand roll-package B' is arrested by its measuring-roll D, which is then engaged by the stop-pawl, thus also setting the cutter in the roll F in proper position for detaching the fully-drawn length from the right-hand paper-roll. These alternate operations may be continued until the roll-packages are exhausted, their journal-slots permitting them to descend as their size decreases. When the wooden cores are empty, they, with their axial rods, may be readily detached from the frame and new rolls of paper inserted, as before described. It will now be seen that these four rolls involve not less than five co-operative combinations: first, the horizontal pair of rolls C and D; second, the left-hand vertical pair C and E; third, the right-hand vertical pair D and F; fourth, the left-hand vertical pair with the right-hand measuring-roll D, and, fifth, the left-hand measuring-roll C with the right-hand vertical pair. This peculiar intermingling of co-operative functions will make it apparent that with respect of the vertical pairs of rolls either may carry the knife, but when carried on the upper roll the end of the paper must be pulled upwardly; but when on the lower roll a downward pull is required, and this I deem especially desirable. Without a knife the lower roll of each pair will still perform a portion of its duty, by means of its corrugations, in co-operating with the upper roll and enabling the use of rolls of smaller diameter than plain rolls affording the same measurement of paper. So, also, may the stopping mechanism be applied to the two lower rolls instead of to the others; but in that case the stop-pawl would be operated, preferably, by a spring, there being hardly sufficient space above for conveniently locating a gravity-pawl between the lower and upper rolls. Inasmuch as the two rolls in each vertical pair of necessity move together in harmony, both do duty as measuring-rolls; but inasmuch as the upper roll has more of its surface in frictional contact with the paper said roll has been termed by me the "measuring-roll," and if the lower roll be deprived of its cutter it would then be a mere bed-roll for the described co-operation with the upper roll. As to the stopping mechanism, it is to be understood that in this preferred form of machine it is thought to be reduced to its extremest simplicity; but more complicated forms have been devised by me in which the stop-pawl or its equivalent is moved positively in both directions, and hence the stop pawl or bar moves parallel with the axis of the rolls instead of radially, as in the form already described.

I have already referred to the fact that the measuring-roll may carry the cutter, and also that if the measuring-roll be plain or smooth that the bed-roll may be used or dispensed with—as, for instance, as illustrated in Figs. 6 to 10, inclusive. In this machine the frame consists of a back plate $g$ and two end plates $g'$, no central plate or hanger being needed. The two roll-packages $B^2$ $B^3$ have wooden cores, having holes at their ends for the reception of the ends of an axial frame consisting of a length of bent wire hinged loosely to the upper edge of the back plate. In this machine each roll-package is supported upon a plain-surfaced roll H or H', each of which serves both as a measuring and as a cutting roll, each having a knife $f$. These rolls have stop-shoulders in the form of pins $d^5$, radially projecting from near their inner ends, and their cam-surfaces $d^6$ are at the outer ends of said rolls. The pins $d^5$ alternate in their engagement with a stop-block $d^7$, projecting forwardly from a longitudinally-sliding bar $d^8$ at the rear of the rolls. This bar $d^8$ has near its ends forwardly-projecting studs $d^9$, which are so engaged by the cam-surfaces $d^6$ at the outer ends of both rolls as to cause said bar to slide to and fro and enable the stop-block $d^7$ to do precisely the same service as that performed by the gravity-pawl of the machine first described. This stop-block is in substance a stop-pawl positively operated, as distinguished from a gravity or a spring pawl, and this releasing-bar and the cam-faces are only such departures from the cam-plates and pawl of the machine first described as are incident to operating a stopping device by a movement in line with the axis of a roll, instead of operating it in a line radial to said axis; and, it will be seen, if the said stop-block be projected into a groove formed between the ends of the two rolls, and the latter had stop-shoulders instead of stop-pins, that the stop-block would then more obviously operate as a positively-actuated laterally-moving pawl, and it is clear that the pins are, in fact, mere stop-shoulders. This machine operates as before described. On tearing off a full length from the left-hand roll-package $B^2$ and then pulling on the projected end from the package $B^3$ the supporting-roll H' will be rotated, as far as the curved slot $e'$ and pin $e$, Fig. 10, will permit, before causing the other roll to revolve, the stop pawl or bar being meantime released and moved, so that the stop-shoulder pin on the roll H' will next be engaged, thus stopping said roll when a proper length of paper has been drawn off, and causing the other roll H to properly project the end of the paper from the package $B^2$. This operation may be indefinitely repeated. In this machine the rolls are each provided with a pawl $h$ for preventing any backward rotation, and this feature may be applied to all of my machines with more or less satisfactory results, although not absolutely required in all of them. Other double machines of this type have been organized and built by me, differing from the one last described only in having the stopping and releasing mechanism located at the inner ends of the combined measuring and cutter roll, as in the measuring-rolls of the machine first described.

Figure 11:
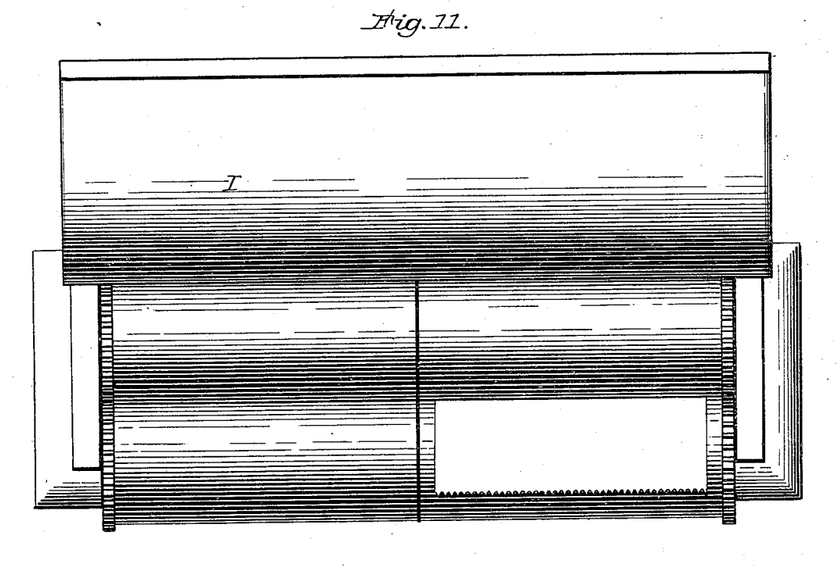
Figs. 11 and 12, in front view and cross-section, illustrate one of my double machines provided with hoppers for the reception of roll-packages of paper.
Figure 12:
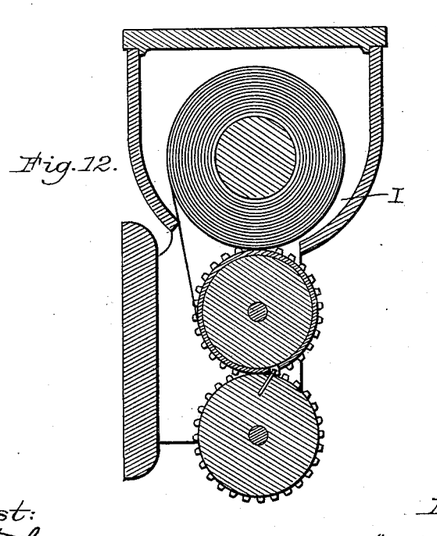
Figure 13:
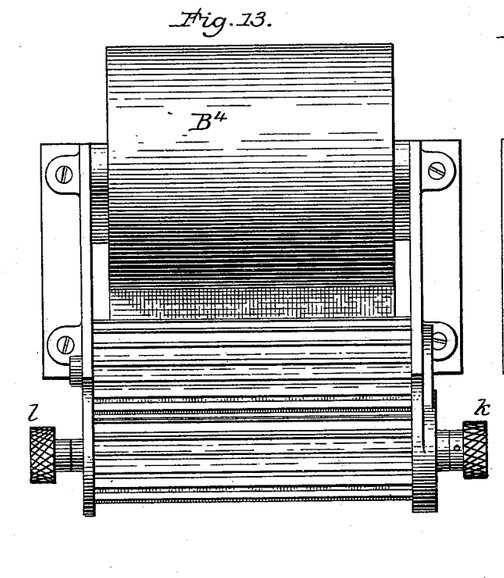
Figs. 13 and 14 illustrate one of my single machines, respectively, in front view and end view.
Figure 14:
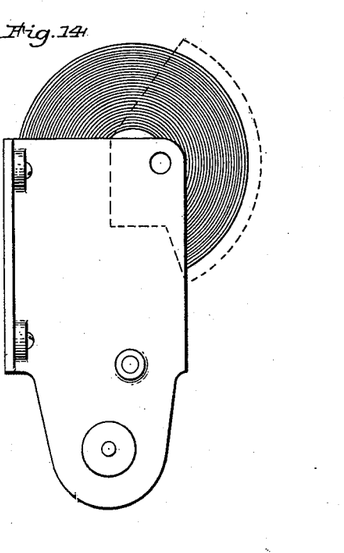
Figure 15:
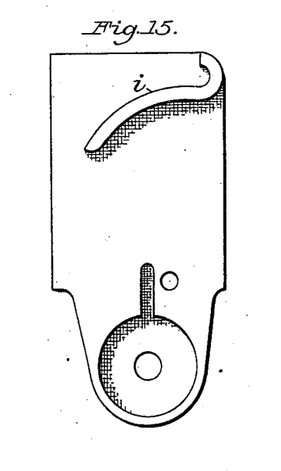
Fig. 15 illustrates the inner face of one of the end plates or brackets of the machine, Fig. 13.
Figure 16:
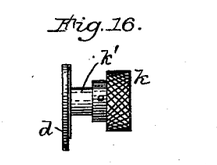
Fig. 16 illustrates in side view a thumb-wheel, its sleeve, and a cam-plate attached thereto by means of which the stopping mechanism is released and the rolls partially rotated for projecting an end of paper after each cutting therefrom.

Double machines of the four-roll form have also been constructed by me in which the rolls are plain and geared together and wherein no axial mounting of the roll-package is required, and, in fact, the paper need not be wound on a core—as, for instance, as illustrated in Figs. 11 and 12. In this machine the four rolls are operated as in the first machine described, but, being plain surfaced, the rolls of each vertical pair are geared together at their ends. A concave-bottomed hopper I, having a detachable cover, is located above each pair of the rolls for the reception of a roll-package of paper, the free end thereof extending downwardly through a slot in the hopper to and between the proper rolls. The surfaces of these rolls being plain may be slightly roughened or clothed with any substance which will secure good frictional contact with the paper for securing the rotative movement. It will be obvious that the corrugated rolls would operate as well with this hopper as do the plain rolls. If in either one of these double machines but one roll-package of paper be used, it will obviously only be necessary after a length of paper has been cut to partially rotate by manipulation the mate to the measuring-roll actually in service.

I will next describe one of my single machines, as illustrated in Figs. 13 to 16, inclusive. I have already hereinbefore stated that in my single machines the stopping mechanism operates automatically and that the releasing is effected by manipulation. In this single machine of Fig. 13 the roll-package of paper $B^4$ has the wooden core and axial rod before described; but the bearings for said rod, as at $i$, on the inner side of the end plate, are mere bearings and do not prevent the detachment of a partially-depleted roll of paper; but in this machine, as in all the others, a skeletonized or open-work cap is desirable for securely inclosing the paper. It will in many cases be also desirable to apply a shield in front of the rolls, as indicated in dotted lines in Fig. 14. In this machine the upper or measuring roll is wholly controlled, as to stopping and releasing, through the lower roll, both being corrugated, as before described. At one end of said lower roll it carries a cam-plate having the same pawl lifting and carrying faces as in the machine Fig. 1, and also the same stop-shoulder. A thumb-wheel $k$ on the outer end of the roll, rod, or shaft is mounted on a sleeve $k'$, located between the thumb-wheel and said shaft, the latter and said sleeve being pinned together. On the inner end of said sleeve there is a second cam-plate $d$, like the one on the roll, and these two plates co-operate with a gravity-pawl, and said plates are operatively connected by a pin and a curved slot, all as described in connection with the machine, Fig. 1. In fact, the said wheel, sleeve, and cam-plate are in substance the same as if they were the inner end of either of the upper rolls in said machine, Fig. 1, and the operation is the same, except that in said machine the releasing from the pawl is automatic, and in this machine it is done by turning the thumb-wheel forwardly, and this movement also imparts a partial forward movement of the rolls for projecting an end of paper. In order that the machine may be mounted on either side of a closet-wall, two thumb-wheels are applied, the other wheel $l$ being at the opposite end of the roll-shaft and pinned thereto. In order to prevent backward rotation of the rolls, the roll-shaft near the wheel $l$ carries a ratchet-wheel, (not shown,) which is engaged by a gravity-pawl similar to that at the other end of the roll, but which requires no releasing, its function being that of an ordinary ratchet-pawl. With this machine the operation is as follows: On pulling upon a protruded end of paper both rolls rotate until checked by the stop-pawl. The cutter on the lower roll is then in position for service, enabling the length of paper to be cut off. Either hand-wheel is then rotated, which releases the stop-pawl and actuates the rolls sufficiently to project the end of the paper conveniently for grasping, whereupon the operation may be repeated.

Rotative devices or rolls which require manipulation have heretofore been organized in closet-paper devices; but said prior rolls are not restricted to one revolution, as in my machines, and so far as my knowledge extends such prior rolls have never operated for determining the length of paper drawn from a roll-package. It will be seen that when the roll-packages are axially mounted in ordinary bearings that they may be of the flat-roll variety.

Figures 17, 19:
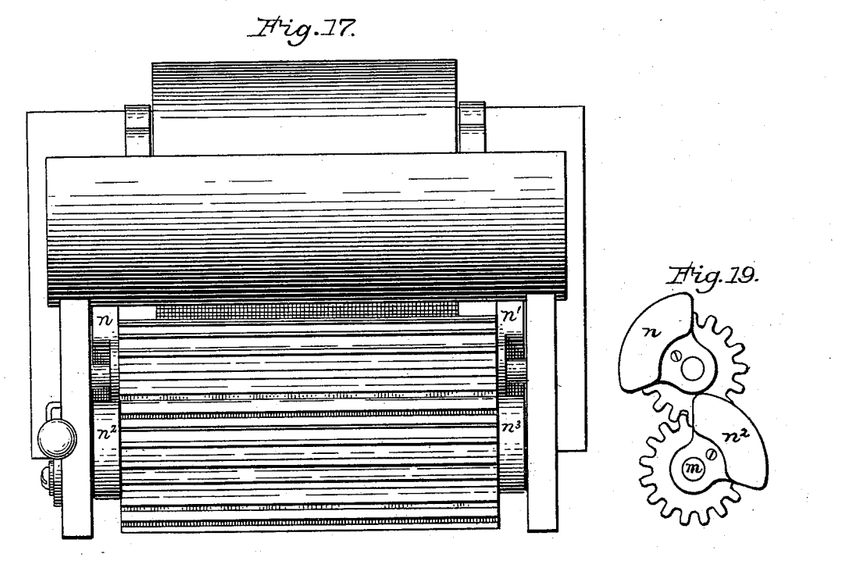
Figs. 17 and 18 illustrate in front and end view one form of my single machines in which there is an automatic partial rotation of the rolls succeeding a manipulated release of the stopping mechanism.
Fig. 19 is an end view of the rolls detached from the frame.
Figure 18:
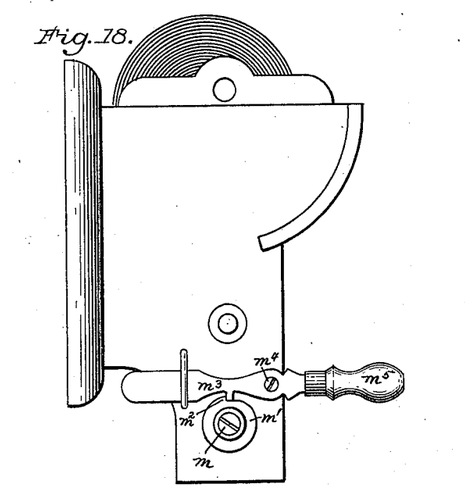

In my single machine last described the stopping mechanism is automatic, as in all of my machines; but the releasing as well as the initial forward rotation of the rolls depend, as already stated, upon manipulation; but said initial forward rotation may be readily rendered automatic in connection with a manipulated release of the stopping mechanism—as, for instance, as illustrated in the single-package machine shown in Figs. 17 to 19, inclusive. In this machine there are two corrugated rolls, one of them carrying a knife, as before described. The lower roll is keyed to its shaft $m$, and said shaft at one end has a cam-plate $m'$, having a stop-shoulder $m^2$ thereon like those on the cam-plates before described. With this stop-shoulder an exterior gravity-pawl $m^3$ is employed; but this pawl is pivoted at $m^4$, and is in the form of a back-weighted lever having a handle $m^5$ at its outer end. Both rolls at their ends have counter-weights $n$ $n'$ $n^2$ $n^3$, each of which is in substance an arm extending radially from the axis of its roll and weighted at the outer end. These weights are so set on each roll and with relation to each other that when the stop-pawl is engaged with the stop-shoulder of the cam-plate both rolls are overweighted at their appropriate front and rear sides, and therefore when the handle of the releasing-lever is depressed and the stop released both rolls automatically make a partial forward rotation and cause the projection of the end of the paper from a roll-package mounted in the machine, so that it may be freely rotated.

It will be seen that with all of the machines described paper can be drawn off in any desired length and then cut, and that such lengths, if cut on the cutter-roll, will be multiples of the single lengths, which equal the circumferential dimensions of the rolls, and while it is desirable in closet-paper machines or for the use of barbers on shaving-paper to restrict the withdrawal of paper to single lengths it would be desirable in connection with some uses of paper to render the stop-motion inoperative until it was desirable to use the cutter—as, for instance, in use on a store-counter which is restricted to the sale of one article requiring a certain length of wrapping-paper of proper width, in making up one package for two or more of said articles the required length of paper could be drawn off by freeing the stop-pawl.

Figure 20:
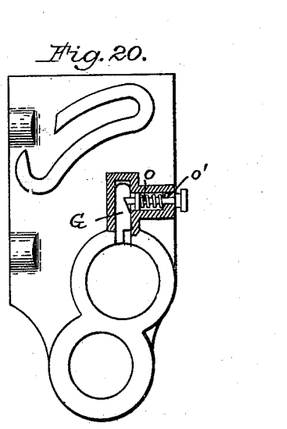
Fig. 20 illustrates the center plate or hanger of a double machine with its gravity-pawl controlled by a spring-pin for keeping said pawl out of service.

It will be seen with respect of the single machine last described that the handle of the stop-pawl may be kept in a depressed position while drawing off any desired length of paper, and either of the double machines can have their stop-pawls as readily controlled—as, for instance, as shown in Fig. 20, wherein the gravity-pawl G is provided with a notch in its shank for engagement by the inner end of a sliding spring-pin o whenever it may be desirable to hold the pawl in its elevated and inoperative position, said pin being maintained in a withdrawn position by means of a lateral stud o' after said pin has been pulled out and partially rotated.

Various other machines have been built by me involving more or less variation in their organization; but those shown and described are deemed ample for imparting such a knowledge of my improvements as will enable their ready application in various other forms without any substantial departure from my invention.

The single-package machines herein disclosed embody certain novel features which may not be appropriately claimed herein, and hence they will be made the subjects of separate applications for Letters Patent. (See Serial Nos. 431,907 and 431,908.)

Having thus described my invention, I claim as new and desire to secure by Letters Patent—

1. In a machine for delivering paper in lengths from a roll-package, the combination, substantially as hereinbefore described, of a support for the package, a roll which is revolved by the contact therewith of drawn-off paper, stopping mechanism operated and controlled by the measuring-roll for restricting the said roll to one revolution, and a rotatively-mounted cutter for severing the drawn-off length of paper.

2. In a machine for delivering paper in lengths from a roll-package, the combination, substantially as hereinbefore described, of a support for the roll-package, a roll which is revolved by the contact of drawn-off paper, stopping mechanism which is operated by the measuring-roll and restricts said roll to one revolution, a rotatively-mounted cutter for severing the drawn-off length of paper, and mechanism for releasing said roll from the stopping mechanism.

3. In a machine for delivering paper in lengths from a roll-package, the combination, substantially as hereinbefore described, of a support for the roll-package, a pair of operatively-connected rolls which are revolved by the contact therewith of drawn-off paper, stopping mechanism which restricts said rolls to one complete revolution, and a cutter for severing a drawn-off length of paper.

4. In a machine for delivering paper in lengths from paper in roll form, the combination, substantially as hereinbefore described, of two rolls rotative by the contact therewith of drawn-off paper, stopping mechanism for restricting said rolls to one revolution, a cutter for severing the lengths of drawn-off paper, means for releasing said rolls from the stopping mechanism, and means for automatically causing said rolls to partially rotate for projecting the free end of paper from said rolls.

5. In a machine for delivering paper in lengths from a roll-package, the combination, substantially as hereinbefore described, of a support for the roll-package, a pair of operatively-connected corrugated rolls, which are revolved by the contact of the drawn-off paper and serve as means for predetermining the lengths of paper to be drawn from said package, stopping mechanism which stops said rolls at the limit of each predetermined length of paper, and a cutter for severing said length from the roll-package.

6. In a machine for delivering paper in lengths from a roll-package, the combination, substantially as hereinbefore described, of a support for the roll-package, a roll which is revolved by the contact of drawn-off paper, stopping mechanism for restricting said roll to one revolution, a cutter for severing the drawn-off length of paper, and automatic releasing mechanism which permits said roll to again make one revolution.

7. In a machine for delivering paper in lengths from packages of paper in roll form, the combination, substantially as hereinbefore described, of independent supports for two roll-packages of paper, two rolls rotative by the contact of paper drawn from said packages, stopping mechanism for restricting both rolls to one complete revolution, and mechanism operated by each roll for releasing the other from the stopping mechanism.

8. In a machine for delivering paper in lengths from a roll-package, the combination, substantially as hereinbefore described, of a support for the roll-package, a cutter for severing drawn-off lengths of paper, a roll which is revolved by the contact of drawn-off paper, stopping mechanism for restricting the said roll to complete revolutions, and means for controlling the stopping mechanism for enabling said roll to revolve any number of times until a required length of paper has been drawn off.

9. In a machine adapted to deliver paper from two roll-packages, the combination, substantially as hereinbefore described, of a pair of rolls for each package, and each pair rotative by contact with paper drawn from their appropriate package, a cutter for each pair of rolls, and stopping mechanism for restricting each pair of rolls to one complete revolution, the upper roll of each pair serving to release the rolls of the other pair from the stopping mechanism and also for imparting thereto a partial forward rotation after each stop.

10. In a machine for delivering paper in lengths from roll-packages, the combination, with a roll-package having an axial opening, of a detachable axial rod within said package and a frame provided with brackets having on their inner sides slotted and downwardly-curved bearings for the ends of said rod, and also having a hole in one of said plates for longitudinally applying said rod to the roll-package, and still further having gatings or openings at the upper side of the inner or lower ends of said slotted bearings, substantially as described, whereby the axial rod of a roll-package may be inserted endwise at the hole in the bracket, secured against displacement until after the paper has been exhausted, and then readily lifted sidewise and outwardly through the gatings.

DARIUS L. GOFF.

Witnesses:
WM. E. TOLMAN,
CHARLES H. SPENCER, Jr.